United States Patent
Li et al.

(10) Patent No.: US 9,992,104 B2
(45) Date of Patent: Jun. 5, 2018

(54) COMMUNICATION METHOD, COMMUNICATION SYSTEM, RESOURCE POOL MANAGEMENT SYSTEM, SWITCH DEVICE AND CONTROL DEVICE

(71) Applicant: China Mobile Communications Corporation, Beijing (CN)

(72) Inventors: Chen Li, Beijing (CN); Lu Huang, Beijing (CN); Zhiheng Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days. days.

(21) Appl. No.: 15/122,323

(22) PCT Filed: Dec. 31, 2014

(86) PCT No.: PCT/CN2014/095739
§ 371 (c)(1),
(2) Date: Aug. 29, 2016

(87) PCT Pub. No.: WO2015/149563
PCT Pub. Date: Oct. 8, 2015

(65) Prior Publication Data
US 2016/0373345 A1    Dec. 22, 2016

(30) Foreign Application Priority Data

Mar. 31, 2014  (CN) .......................... 2014 1 0127774

(51) Int. Cl.
*H04L 12/28* (2006.01)
*H04L 12/721* (2013.01)
(Continued)

(52) U.S. Cl.
CPC .......... *H04L 45/38* (2013.01); *H04L 12/4633* (2013.01); *H04L 12/4641* (2013.01);
(Continued)

(58) Field of Classification Search
CPC ......... H04L 45/38; H04L 45/02; H04L 45/64; H04L 12/4633; H04L 12/4641; H04L 12/6418; H04L 61/2007
(Continued)

(56) References Cited

U.S. PATENT DOCUMENTS 9,762,451 B2 *  9/2017  Liu .................... H04L 41/145
9,825,817 B2 * 11/2017  Liu .................... H04L 41/145
(Continued)

FOREIGN PATENT DOCUMENTS

| CN | 103346922 A  | 10/2013 |
| CN | 103475722 A  | 12/2013 |
| WO | 2013020126 A1 | 2/2013 |

OTHER PUBLICATIONS

International Search Report for International Application No. PCT/CN2014/095739 dated Apr. 1, 2015.
(Continued)

*Primary Examiner* — Chuong T Ho
(74) *Attorney, Agent, or Firm* — Arch & Lake LLP

(57) ABSTRACT

The present disclosure provides a communication method, a communication system, a resource pool management system, a switch device and a control device in a Software-Defined Network (SDN). The communication method may include steps of: obtaining network attributes of one or more virtual machines which are configured by a resource pool management system based on operations on a network resource pool by a user; converting tenant networking topology information derived from the network attributes into flow tables, in the case that a first virtual machine and a second virtual machine attempt to communicate with each other for the first time; and distributing the flow tables to one or more switch devices corresponding to the one or more virtual machines, so as to directly discard packets to be transmitted during the communication for the first time and
(Continued)

subsequent communication between the first virtual machine and the second virtual machine, in response to determining by one of the switch devices that the communication between the first virtual machine and the second virtual machine is disabled based on a corresponding flow table. In the communication method, it is not necessary for the controller to broadcast the ARP messages to the whole SDN, and it is reduced the number of the packet_in packets to be transmitted to the SDN controller, so that the network resources of the SDN may be fully utilized, and the availability of the network resources and the controller resources are improved.

20 Claims, 10 Drawing Sheets

(51) Int. Cl.
  *H04L 12/64* (2006.01)
  *H04L 12/46* (2006.01)
  *H04L 12/715* (2013.01)
  *H04L 12/751* (2013.01)
  *H04L 29/12* (2006.01)

(52) U.S. Cl.
  CPC .......... *H04L 12/6418* (2013.01); *H04L 45/02* (2013.01); *H04L 45/64* (2013.01); *H04L 61/2007* (2013.01)

(58) Field of Classification Search
  USPC .................................. 370/392, 390, 389, 254
  See application file for complete search history.

(56) References Cited

U.S. PATENT DOCUMENTS

| | | |
|---|---|---|
| 2011/0134931 A1 | 6/2011 | Merwe et al. |
| 2013/0166720 A1 | 6/2013 | Takashima et al. |
| 2013/0170354 A1 | 7/2013 | Takashima et al. |
| 2014/0195666 A1* | 7/2014 | Dumitriu ............ H04L 12/4625 709/223 |
| 2014/0241353 A1* | 8/2014 | Zhang .................... H04L 45/74 370/390 |
| 2016/0006623 A1* | 1/2016 | Liu ........................ H04L 41/145 370/254 |
| 2016/0036678 A1* | 2/2016 | Zhang ................... H04L 41/145 709/224 |
| 2016/0050120 A1* | 2/2016 | Liu ........................ H04L 41/145 370/254 |

OTHER PUBLICATIONS

Extended European Search Report in connection with corresponding EP Application No. 14888266.5, dated Nov. 8, 2017, 9 pages.

* cited by examiner

COMMUNICATION METHOD, COMMUNICATION SYSTEM, RESOURCE POOL MANAGEMENT SYSTEM, SWITCH DEVICE AND CONTROL DEVICE

CROSS-REFERENCE TO RELATED APPLICATION

This application is the U.S. national phase of PCT Application No. PCT/CN2014/095739 filed on Dec. 31, 2014, which claims priority to Chinese Patent Application No. 201410127774.0 filed on Mar. 31, 2014, the disclosures of which are incorporated in their entirety by reference herein.

TECHNICAL FIELD

The present disclosure relates to the field of network communication technology, in particular to a communication method, a communication system, a resource pool management system, a switch device and a control device for a Software-Defined Network (SDN).

BACKGROUND

In recent years, the SDN technique is becoming one of the most popular network technologies, and is a suitable candidate for constructing an enterprise network, a campus network, a data center network and so forth. A core idea behind the SDN is to separate a data plane and a control plane, and to control the network centrally by a remote controller.

In the SDN, network control and network forwarding are separated and managed by a dedicated device. The network forwarding is implemented by a dedicated OpenFlow-based SDN switch device. The network control is implemented by the OpenFlow-based SDN controller, which implements computations for basic network functions, such as topology management, flow table management, device configuration, and so forth.

As illustrated in FIG. 1 showing an example of an SDN architecture in the related art, the SDN includes three OpenFlow (OF) switch devices for communication. All of these three OF switch devices are controlled by one SDN controller through the OpenFlow protocol. The OF switch device 1 and the OF switch device 3 are access switch devices and connected to a host A and a host B respectively; and the OF switch device 2 is an aggregation switch connected to the SDN controller.

When the host A (a physical server or a virtual machine) accesses the SDN network and requests the SDN network to communicate with the host B, the OF switch device 1 determines that it is the first time for receiving data packets on the request, the OF switch device 1 forwards a first one of the data packets to the SDN controller, i.e. reports a packet_in packet to the SDN controller.

Then, the SDN controller generates flow tables based on the first data packet. More specifically, the SDN controller receives the first data packet, and determines that a destination receiver for the data packets is the host B based on information including five elements such as a destination Media Access Control (MAC) address, a destination Internet Protocol (IP) address, and so forth. When position information of the host B is stored in the SDN controller, the SDN controller calculates an end-to-end flow table from the host A to the host B, and distributes the end-to-end flow table to the OF switch device 3 on the path. When position information of the host B is not stored in the SDN controller, the SDN controller broadcasts an Address Resolution Protocol (ARP) message in the SDN to search for the host B. In response to the ARP message, the OF switch device 3 feeds back to the SDN controller. The SDN controller generates the flow tables hop by hop based on the topology information, i.e. the SDN controller generates a flow table for the OF switch device 1 based on a hop from a port corresponding to the host A to a port of the OF switch device 2, a flow table for the OF switch device 2 based on a hop from a port corresponding to the OF switch device 1 to a port of the OF switch device 3, and a flow table for the OF switch device 3 based on a hop from a port corresponding to the OF switch device 2 to a port of host B, and distributes these three flow tables to the OF switch devices 1, 2 and 3 respectively.

However, in the above mechanism for reporting the packet_in packet, the switch devices transmit a large number of packet_in packets to the SDN controller, so that a performance of the SDN controller deteriorates and a size of the SDN has to be reduced.

Furthermore, in the process of broadcasting the ARP messages in the SDN by the SDN controller, the SDN controller may generates a lot of broadcasting messages, so that the network resources are wasted, availability of the network resources and the controller resources are reduced, and the size of the SDN has to be reduced.

In addition, in the conventional SDN architecture, a resource pool management system produced by Openstack, VMWare, Microsoft, Citrix and so forth in a cloud computing data center is divorced from a data center network. For example, information on creating, modifying or deleting a host in the resource pool cannot be transmitted to the SDN.

SUMMARY

(1) Technical Problems to be Solved

An object of the present disclosure is to provide a communication method, a communication system, a resource pool management system, a switch device and a control device in an SDN, so as to eliminate the requirement for broadcasting the ARP messages by the SDN controller and reduce the number of the packet_in packets transmitted to the SDN controller.

(2) Technical Solutions

The technical solutions of the present disclosure are as follows.

The present disclosure provides in some embodiments a communication method for a controller in an SDN, including steps of: obtaining network attributes of one or more virtual machines which are configured by a resource pool management system based on operations on a network resource pool by a user; converting tenant networking topology information derived from the network attributes into flow tables, in the case that a first virtual machine and a second virtual machine attempt to communicate with each other for the first time; and distributing the flow tables to one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

For example, in the above communication method, after the step of obtaining the network attributes, the method further includes a step of: establishing one or more logical tunnels among the one or more switch devices corresponding to the one or more virtual machines, so as to logically connect the corresponding switch devices.

For example, in the above communication method, after the step of distributing the flow tables to one or more switch devices corresponding to the one or more virtual machines, the method further includes a step of: controlling, by the one or more switch devices, the communication between the first virtual machine and the second virtual machine based on the flow tables, which includes steps of: receiving a packet transmitted from the first virtual machine to the second virtual machine, and converting the received packet into a first packet_in packet in response to determining that the first virtual machine and the second virtual machine communicate with each other for the first time; receiving a packet transmitted from the first virtual machine to the second virtual machine, and in response to determining that the first virtual machine and the second virtual machine do not communicate with each other for the first time, the method further includes steps of: determining that the first virtual machine and the second virtual machine are capable of communicating with each other in the case that the communication between the first virtual machine and the second virtual machine is consistent with one of the flow tables, and transmitting the packet to the switch device corresponding to the second virtual machine; determining that the first virtual machine and the second virtual machine are incapable of communicating with each other when the communication between the first virtual machine and the second virtual machine is consistent with none of the flow tables, and directly discarding the packet; and converting the packet into a second packet_in packet in response to determining that none of the flow tables is consistent with the communication between the first virtual machine and the second virtual machine.

For example, in the above communication method, the communication method further includes steps of: receiving a report packet transmitted by the switch device; converting the tenant networking topology information into the flow table in the case that the report packet is the first packet_in packet; and calculating an end-to-end path based on correspondence information between a server host and the first virtual machine and correspondence information between the server host and the second virtual machine, forming the flow table between the first virtual machine and the second virtual machine, and transmitting the flow table to the switch devices corresponding to the first virtual machine and the second virtual machine respectively, in the case that the report packet is the second packet_in packet.

For example, in the above communication method, in the step of obtaining network attributes of one or more virtual machines which are configured by a resource pool management system based on operations on a network resource pool by a user, the network attributes are recorded in a network information table which is created by the resource pool management system based on the network attributes.

For example, in the above communication method, the tenant networking topology information includes a tenant subnet interworking policy information which is pre-configured by the user through the resource pool management system, information on positions of the server hosts where the virtual machines reside respectively, and information on the switch devices connected to the virtual machines.

For example, in the above communication method, the network attributes include IP addresses, Virtual Local Area Network (VLAN) Identifications (IDs), Virtual Extensible Local Area Network (VXLAN) IDs, tunnel IDs, and Virtual Routing and Forwarding (VRF) IDs of the virtual machines which are configured by the resource pool management system based on the operation of the user, information on server hosts where the virtual machines reside, physical switch device ports connected to the server hosts, and the tenant networking topology information.

The present disclosure further provides in some embodiments a control device for a SDN, wherein the control device includes a controller, the controller including: a data receiving module that obtains network attributes of one or more virtual machines which are configured by a resource pool management system based on operations on a network resource pool by a user; a data processing module that converts tenant networking topology information derived from the network attributes into flow tables, in the case that a first virtual machine and a second virtual machine attempt to communicate with each other for the first time; and a data transmission module that distributes the flow tables to one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

For example, in the above control device, the controller further includes: a resource establishment module that establishes one or more logical tunnels among the one or more switch devices corresponding to the one or more virtual machines, so as to logically connect the corresponding switch devices.

For example, in the above control device, the data obtaining module further receives a report packet transmitted by the switch device, wherein the data processing module converts the tenant networking topology information into the flow table in the case that the report packet is the first packet_in packet, and the first packet_in packet is obtained by converting a packet received by the switch device in response to the communication between the first virtual machine and the second virtual machine for the first time.

The controller further includes: a path calculation module that calculates an end-to-end path based on correspondence information between a server host and the first virtual machine and correspondence information between the server host and the second virtual machine, forms the flow table between the first virtual machine and the second virtual machine, and transmits the flow table to the switch devices corresponding to the first virtual machine and the second virtual machine respectively, in the case that the report packet is a second packet_in packet, wherein in the case that the switch device receives a packet in response to the communication between the first virtual machine and the second virtual machine not performed for the first time, and determines that none of the flow tables is consistent with the communication between the first virtual machine and the second virtual machine, the switch device converts the packet into the second packet_in packet and transmits the second packet_in packet to the data receiving module.

For example, in the above control device, the data receiving module obtains a network information table from the resource pool management system, and the network attributes are recorded in the network information table which is created by the resource pool management system based on the network attributes.

For example, in the above control device, the tenant networking topology information includes a tenant subnet interworking policy information which is pre-configured by the user through the resource pool management system, information on positions of the server hosts where the virtual machines reside respectively, and information on the switch devices connected to the virtual machines.

For example, in the above control device, the network attributes include IP addresses, VLAN Identifications (IDs), VXLAN IDs, tunnel IDs, and VRF IDs of the virtual machines which are configured by the resource pool management system based on the operation of the user, information on server hosts where the virtual machines reside, physical switch device ports connected to the server hosts, and the tenant networking topology information.

The present disclosure further provides in some embodiments a communication method for a resource pool management system in an SDN, including steps of: configuring one or more virtual machines based on operations on a network resource pool by a user, and assigning network resources to the virtual machines; generating network attributes based on information on the network resources; and transmitting the network attributes to a controller, so that the controller is capable of obtaining tenant networking topology information from the network attributes, and wherein in the case that a first virtual machine and a second virtual machine attempt to communicate with each other for the first time, the controller is capable of converting the tenant networking topology information into flow tables, and distributing the flow tables to one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

For example, in the above communication method, the step of configuring one or more virtual machines based on operations on a network resource pool by a user and assigning network resources to the virtual machines includes steps of: configuring the virtual machines based on operations on the network resource pool by the user; and creating in a physical network resource the same number of virtual machines for physical ports and logical ports of at least one server host, and assigning corresponding network resources to the physical ports and the logical ports based on the virtual machines configured in the resource pool, wherein the physical network resource includes a plurality of server hosts and a plurality of switch devices.

For example, in the above communication method, after the step of generating network attributes based on information on the network resources, the method further includes steps of: forming a network information table based on the network attributes, and transmitting the network attributes to the controller by transmitting the network information table to the controller.

The present disclosure further provides a resource pool management system including: a resource management module that configures one or more virtual machines based on operations on a network resource pool by a user, and assigns network resources to the virtual machines; an attribute generation module that generates network attributes based on information on the network resources; and an information transmission module that transmits the network attributes to a controller, so that the controller is capable of obtaining tenant networking topology information from the network attributes, and wherein in the case that a first virtual machine and a second virtual machine attempt to communicate with each other for the first time, the controller is capable of converting the tenant networking topology information into flow tables, and distributing the flow tables to one or more switch devices corresponding to the one or more virtual machines, so as to directly discard packets to be transmitted between during the communication for the first time and subsequent communication between the first virtual machine and the second virtual machine, in response to determining by one of the switch devices that the communication between the first virtual machine and the second virtual machine is disabled based on a corresponding flow table.

For example, in the above resource pool management system, the resource management module includes: a calculation resource management module that configures the virtual machines based on operations on the network resource pool by the user; and a network resource management module that creates in a physical network resource the same number of virtual machines for physical ports and logical ports of at least one server host, and assigns corresponding network resources to the physical ports and the logical ports based on the virtual machines configured in the resource pool, wherein the physical network resource includes a plurality of server hosts and a plurality of switch devices.

The present disclosure further provides in some embodiments a communication method for a switch device in an SDN, including steps of: receiving a packet in response to the communication between a first virtual machine and a second virtual machine; obtaining one or more flow tables from a controller, and obtaining matching results by matching operations with the flow tables, wherein the flow tables are used for the communication between the virtual machines configured by a resource pool management system based on operations on a network resource pool by a user, and the flow tables are generated by the controller based on tenant networking topology information on network resources for virtual machines; and discarding directly a packet to be transmitted during the communication for the first time and subsequent communication between the first virtual machine and the second virtual machine, in response to determining that the communication between the first virtual machine and the second virtual machine is disabled based on the matching results.

For example, in the above communication method, after the step of receiving a packet transmitted during the communication between a first virtual machine and a second virtual machine, the method further includes steps of: determining whether the communication between the first virtual machine and the second virtual machine is performed for the first time, converting the packet into a first packet_in packet and transmitting the first packet_in packet to the controller in response to determining that the communication between the first virtual machine and the second virtual machine is performed for the first time, and executing further steps in response to determining that the communication between the first virtual machine and the second virtual machine is not performed for the first time.

For example, in the above communication method, after the step of obtaining matching results, the method further includes steps of: transmitting the packet to the switch device corresponding to the second virtual machine, in response to determining that the first virtual machine and the second virtual machine are capable of communicating with each other based on the matching results, and converting the packet into a second packet_in packet and transmitting the second packet_in packet to the controller, so that the controller obtains the second packet_in packet, calculates an end-to-end path based on correspondence information between a server host and the first virtual machine and correspondence information between the server host and the second virtual machine, and generates the flow table between the first virtual machine and the second virtual machine, in response to determining that none of the flow tables is consistent with the communication between the first virtual machine and the second virtual machine based on the matching results.

The present disclosure further provides a switch device including: a packet obtaining module that receives a packet transmitted during the communication between a first virtual machine and a second virtual machine; a matching module that obtains one or more flow tables from a controller, and obtains matching results by matching operations with the flow tables, wherein the flow tables are used for the communication between the virtual machines configured by a resource pool management system based on operations on a network resource pool by a user, and the flow tables are generated by the controller based on information on network resources for virtual machines; and a first packet processing module that discards directly a packet to be transmitted during the communication for the first time and subsequent communication between the first virtual machine and the second virtual machine, in response to determining that the communication between the first virtual machine and the second virtual machine is disabled based on the matching results.

For example, in the above switch device, the switch device further includes: a determination module that determines whether the communication between the first virtual machine and the second virtual machine is performed for the first time; and a packet conversion module that converts the packet into a first packet_in packet and transmits the first packet_in packet to the controller in response to determining that the communication between the first virtual machine and the second virtual machine is performed for the first time, and transmits the packet to the matching module in response to determining that the communication between the first virtual machine and the second virtual machine is not performed for the first time.

For example, in the above switch device, the switch device further includes: a second packet processing unit that transmits the packet to the switch device corresponding to the second virtual machine, in response to determining that the first virtual machine and the second virtual machine are capable of communicating with each other based on the matching results; and a third packet processing unit that converts the packet into a second packet_in packet and transmits the second packet_in packet to the controller, so that the controller obtains the second packet_in packet, calculates an end-to-end path based on correspondence information between a server host and the first virtual machine and correspondence information between the server host and the second virtual machine, and generates the flow table between the first virtual machine and the second virtual machine, in response to determining that none of the flow tables is consistent with the communication between the first virtual machine and the second virtual machine based on the matching results.

The present disclosure further provides in some embodiments a communication system in a Software-Defined Network SDN, including: a plurality of server hosts; the above control device; the above resource pool management system; and the above switch devices, wherein each server host is connected to one of the switch devices, the switch devices are connected to the control device, and the control device is connected to the resource pool management system.

(3) Advantageous Effects

The following advantageous effects may be obtained by at least one of the above technical solutions provided by the embodiments of the present disclosure.

The controller may obtain the topology information of the whole SDN based on the received network attributes of the virtual machines. Comparing with the SDN architecture in the related art, in the embodiments of the present disclosure, it is not necessary for the controller to broadcast the ARP messages to the whole SDN when the two virtual machines attempt to communicate with each other for the first time; in contrast, the flow tables are stored in the switch devices, and the switch devices may determine that the two virtual machines cannot communicate with each other and discard directly the packets to be transmitted between these two virtual machines. As a result, it is reduced the number of the packet_in packets to be transmitted to the SDN controller when the two virtual machines cannot communicate with each other, and thereby the network resources of the SDN may be fully utilized, and the availability of the network resources and the controller resources are improved.

BRIEF DESCRIPTION OF THE DRAWINGS

In order to illustrate the technical solutions of the present disclosure or the related art in a clearer manner, the drawings desired for the embodiments will be described briefly hereinafter. Obviously, the following drawings merely relate to some embodiments of the present disclosure, and based on these drawings, a person skilled in the art may obtain the other drawings without any creative effort.

DETAILED DESCRIPTION

Figure 1:
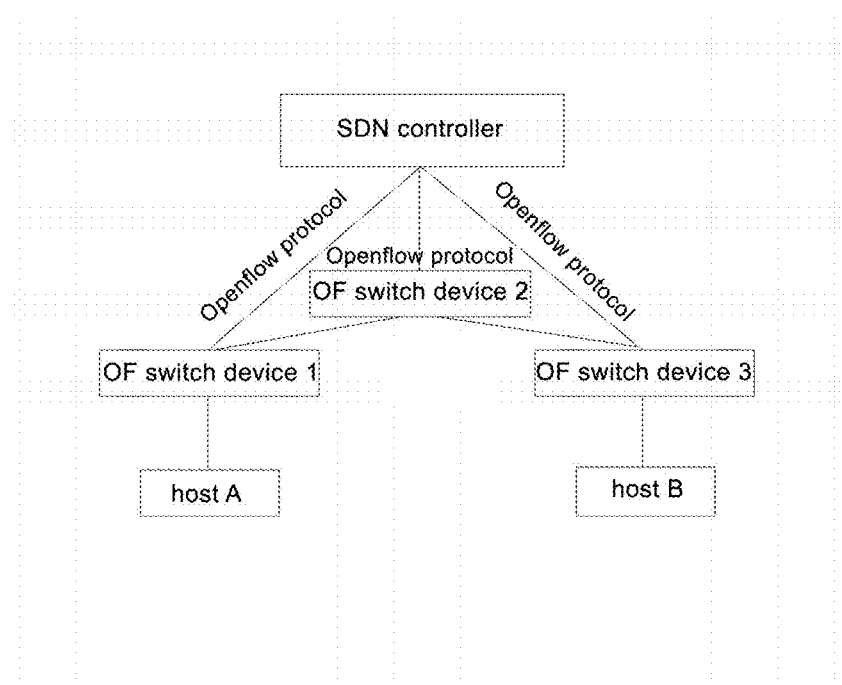
FIG. 1 is a schematic view showing an example of the SDN architecture in the related art.

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, some technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure will be described hereinafter in conjunction with the drawings and embodiments. The following embodiments are for illustrative purposes only, but shall not be used to limit the scope of the present disclosure.

The present disclosure provides in some embodiments a communication method for a controller in the SDN, including steps of:

obtaining network attributes of one or more virtual machines which are configured by a resource pool management system based on operations on a network resource pool by a user;

converting tenant networking topology information derived from the network attributes into flow tables, in the case that a first virtual machine and a second virtual machine attempt to communicate with each other for the first time; and distributing the flow tables to one or more switch devices corresponding to the one or more virtual machines, so that the switch devices may control the communication between the first virtual machine and the second virtual machine based on the flow tables.

In the communication method according to this embodiment, it is transmitted the network attributes of the network resources which are configured for the user virtual machines by the resource pool management system to the controller, and it is distributed the flow tables obtained by converting the tenant networking topology information derived from the network attributes to the switch devices, so that the switch devices may control the communication between the first virtual machine and the second virtual machine based on the flow tables. For example, when the first virtual machine and the second virtual machine attempt to communicate with each other, the switch device determines whether a subnet of the first virtual machine is capable of being connected to a subnet of the second virtual machine by determining whether one of the flow tables being stored is consistent with the communication. When it is determined that the two subnets are capable of being connected, the two virtual machines may communicate with each other. When it is determined that the two subnets are incapable of being connected, the packets to be transmitted between the two virtual machines are discarded directly. When none of the flow tables is consistent with the communication, the packets to be transmitted between the two virtual machines are converted to the packet_in packets and transmitted to the controller. The controller calculates an end-to-end path based on a network information table, and distributes the flow tables to the corresponding switch devices.

In the above communication method, the controller may obtain the topology information of the whole SDN based on the received network attributes of the virtual machines. Comparing with the SDN architecture in the related art, in the embodiments of the present disclosure, it is not necessary for the controller to broadcast the ARP messages to the whole SDN when the two virtual machines attempt to communicate with each other for the first time; in contrast, the flow tables are stored in the switch devices, and the switch devices may determine that the two virtual machines cannot communicate with each other and discard directly the packets to be transmitted between these two virtual machines. As a result, it is reduced the number of the packet_in packets to be transmitted to the SDN controller when the two virtual machines cannot communicate with each other, and thereby the network resources of the SDN may be fully utilized, and the availability of the network resources and the controller resources are improved.

The above tenant networking topology information includes a tenant subnet interworking policy information which is pre-configured by the user through the resource pool management system, information on positions of the server hosts where the virtual machines reside respectively, and information on the switch devices connected to the virtual machines.

Hereinafter, the communication system and the communication method will be explained by referring to FIG. 2, which is the schematic view of the communication system for the SDN according to the embodiment of the present disclosure.

Figure 2:
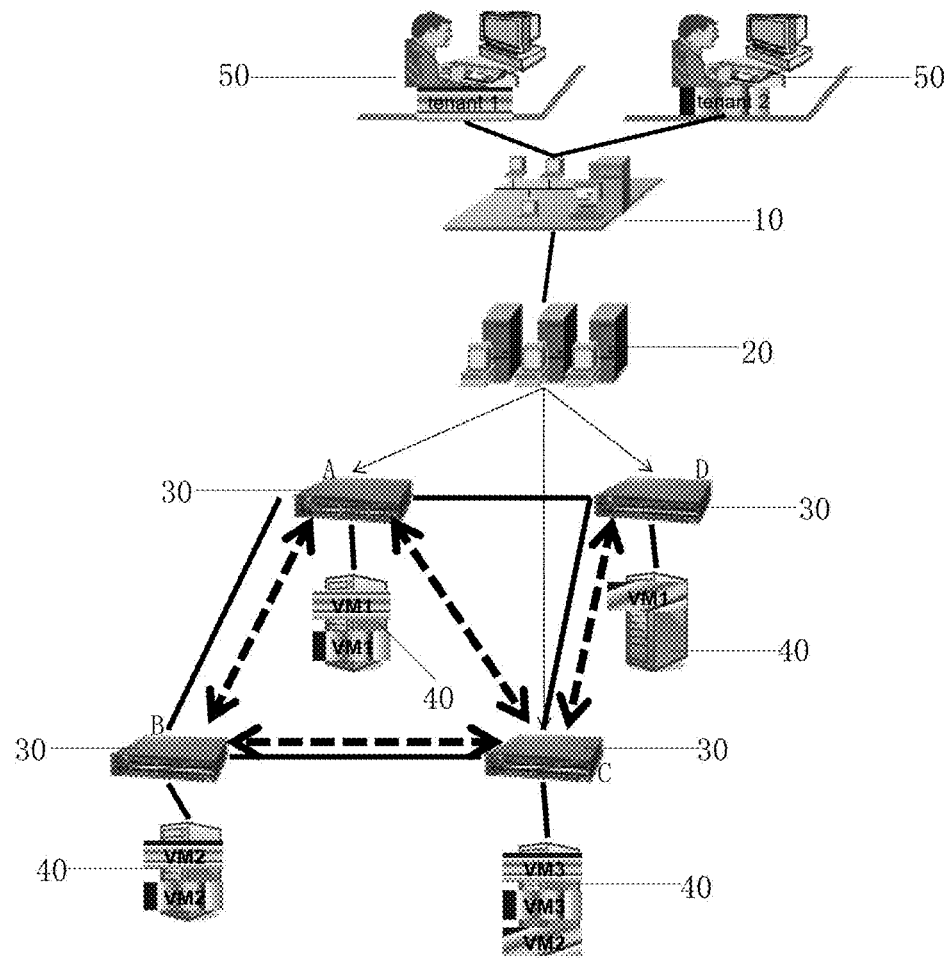
FIG. 2 is a schematic view showing a communication system for the SDN according to an embodiment of the present disclosure.

As shown in FIG. 2, the communication system includes a resource pool management system 10, a controller 20, a switch device 30 and a server host 40. The resource pool management module 10 is connected to a client device 50, so that the client device 50 may create, modify or delete the network resources being used. The controller 20 is connected to both the resource pool management system 10 and the switch device 30, and the server hosts 40 are connected to the switch devices 30 respectively.

Figure 3:
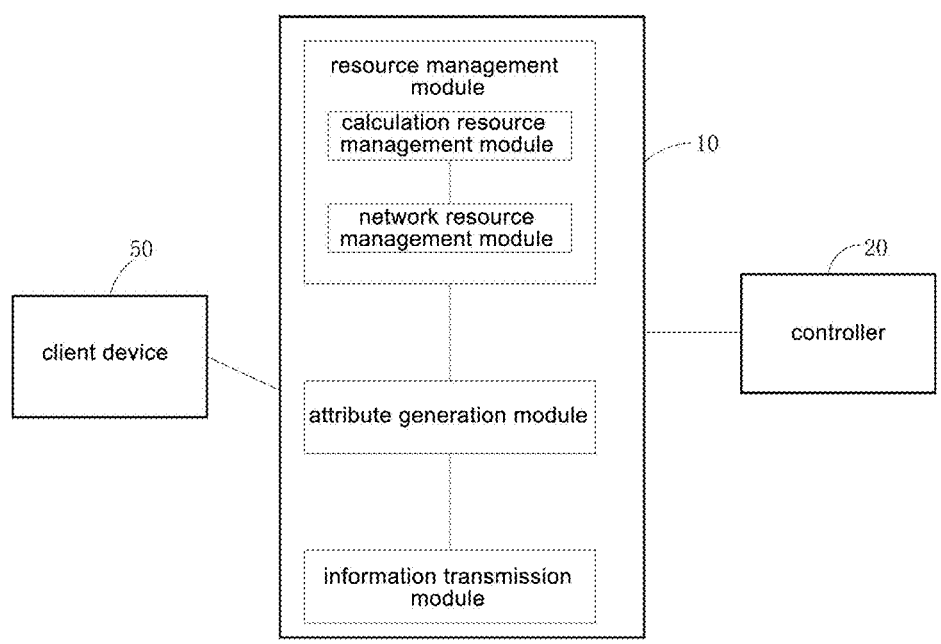
FIG. 3 is a schematic view showing an architecture of a resource pool management system as well as components connected to the resource pool management system according to an embodiment of the present disclosure.

As shown in FIG. 3, the resource pool management system 10 includes: a resource management module that configures one or more virtual machines based on operations on a network resource pool by a user, and assigns network resources to the virtual machines; an attribute generation module that generates network attributes based on information on the network resources; and an information transmission module that transmits the network attributes to the controller 20, so that the controller 20 is capable of obtaining tenant networking topology information from the network attributes, and wherein in the case that a first virtual machine and a second virtual machine attempt to communicate with each other for the first time, the controller 20 is capable of converting the tenant networking topology information into flow tables, and distributing the flow tables to one or more switch devices 30 corresponding to the one or more virtual machines, so that the virtual machines may communicate with each other based on the flow tables. In particular, a packet to be transmitted is directly discarded during the communication for the first time and subsequent communication between the first virtual machine and the second virtual machine, when the switch device determines that the communication between the first virtual machine and the second virtual machine is disabled based on the flow tables.

In particular, the resource management module includes:

a calculation resource management module that configures the virtual machines based on operations on the network resource pool by the user; and a network resource management module that creates in a physical network resource the same number of virtual machines for physical ports and logical ports of at least one server host, and assigns corresponding network resources to the physical ports and the logical ports based on the virtual machines configured in the resource pool, wherein the physical network resource includes a plurality of server hosts and a plurality of switch devices.

The above resource pool management system 10 may provide the client device 50 with an operational management interface, by which the client device 50 may request to create, modify and delete the network resources being used. The above resource pool management system 10 configures the virtual machines for the users, which includes creating, modifying and deleting corresponding virtual machines and network resources. When the request submitted by the client device 50 by the operational management interface is approved, the calculation resource management unit included in the resource pool management system 10 configures the virtual machine corresponding to an operation on the network resource pool by the user through the operational management interface in the resource pool based on the operation, which includes deleting an old (legacy) virtual machine, creating a new virtual machine and so forth. Meanwhile, the calculation resource management unit notifies the network resource management unit, so that the network resource management unit may create the same number of virtual machines for physical ports and logical ports of at least one server host based on the virtual machines configured in the resource pool, assign corresponding network resources to these virtual machines, create a logical network for the client device and create a virtual machine on the port of the server host 40.

For example, the operation of the client device is to create a virtual machine. In this case, as shown in FIG. 2 in which the blocks filled by horizontal lines represent the virtual machines of the first client device (the tenant 1) and the blocks filled by vertical lines represent the virtual machines of the second client device (the tenant 2). As for the first client device, the virtual machines VM1, VM2 and VM3 are created for the physical ports and the logical ports of the server hosts 40 connected to the switch devices A, B and C respectively. Similarly, as for the second client device, the virtual machines VM1, VM2 and VM3 are created for the physical ports and the logical ports of the server hosts 40 connected to the switch devices A, B and C respectively.

As indicated by the solid lines in FIG. 2, the switch devices A, B, C and D are physically connected.

In addition, as indicated by the dot lines in FIG. 2, the controller 20 may establish logical tunnels among the switch devices corresponding to the virtual machines, so as to logically connect the corresponding switch devices.

In the above embodiment, the resource pool management system 10 configures the network resources for the virtual machines corresponding to the client devices, and the network resources include IP addresses, VLAN Identifications (IDs), VXLAN IDs, tunnel IDs, and VRF IDs of the virtual machines which are configured by the resource pool management system based on the operation of the user, information on server hosts where the virtual machines reside, physical switch device ports connected to the server hosts, the tenant networking topology information, and so forth. In addition, the client device itself may configure access policies for the access among the virtual machines in a same subnet or different subnets by the operational management interface of the resource pool management system 10, and thus generate a subnet interworking policy information. The tenant networking topology information includes the tenant subnet interworking policy information, information on positions of the server hosts where the virtual machines reside respectively, and information on the switch devices connected to the virtual machines, and the network attributes includes the tenant networking topology information and the above information.

For example, the resource pool management system 10 records the above network attributes in a network information table including the information on the server hosts 40 where the virtual machines corresponding to the client devices reside respectively, the information on the switch devices 30 corresponding to the server hosts 40, the information on the connectivity among the corresponding switch devices 30 and the access policy information (the subnet interworking policy information).

In particular, the contents of the network information table are as shown in Table 1.

TABLE 1

User Name
User Subnet
Subnet Interworking Policy
Virtual Machine Name
MAC Address of Virtual Machine
IP Address of Virtual Machine
Corresponding Server Host
Corresponding Physical Port
Corresponding Logical Port
MAC Address of Server Host
IP Address of Server Host
Switch Device Connected to Server Host The above is merely an example of the contents being stored in the network information table, which is not limited thereto.

Figure 4:
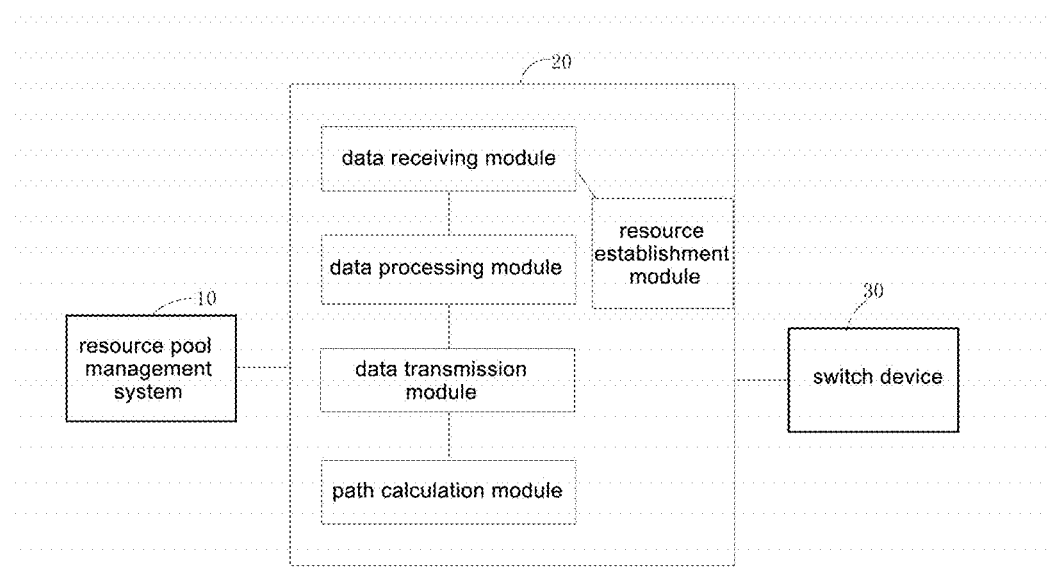
FIG. 4 is a schematic view showing an architecture of a controller as well as components connected to the controller according to an embodiment of the present disclosure.

The data processing module transmits the network information table including the above contents to the controller 20. As shown in FIGS. 2 and 4, the controller 20 includes: a data receiving module that obtains network attributes of one or more virtual machines which are configured by a resource pool management system 10 based on operations on a network resource pool by a user; a data processing module that converts tenant networking topology information derived from the network attributes into flow tables, in the case that a first virtual machine and a second virtual machine attempt to communicate with each other for the first time; and a data transmission module that distributes the flow tables to one or more switch devices 30 corresponding to the one or more virtual machines, so that the switch devices 30 may control the communication between the first virtual machine and the second virtual machine based on the flow tables. In particular, a packet to be transmitted is directly discarded during the communication for the first time and subsequent communication between the first virtual machine and the second virtual machine, when the switch device determines that the communication between the first virtual machine and the second virtual machine is disabled based on the flow tables.

The controller further includes: a resource establishment module that establishes one or more logical tunnels among the one or more switch devices 30 corresponding to the one or more virtual machines, so as to logically connect the corresponding switch devices 30.

In addition, the data receiving module further receives a report packet transmitted by the switch device, wherein the data processing module converts the tenant networking topology information into the flow table in the case that the report packet is the first packet_in packet, and the first packet_in packet is obtained by converting a packet received by the switch device in response to the communication between the first virtual machine and the second virtual machine for the first time.

The controller further includes: a path calculation module that calculates an end-to-end path based on correspondence information between a server host and the first virtual machine and correspondence information between the server host and the second virtual machine, forms the flow table between the first virtual machine and the second virtual machine, and transmits the flow table to the switch devices corresponding to the first virtual machine and the second virtual machine respectively, in the case that the report packet is a second packet_in packet transmitted by one of the switch devices. And in the case that the switch device receives a packet in response to the communication between the first virtual machine and the second virtual machine not performed for the first time, and determines that none of the flow tables is consistent with the communication between the first virtual machine and the second virtual machine, the switch device converts the packet into the second packet_in packet and transmits the second packet_in packet to the data receiving module.

Based on the above architecture of the controller 20, the data receiving module included in the controller 20 obtains the above network information table from the data processing module 10. Based on the network information table, the resource establishing module establishes one or more logical tunnels among the switch devices corresponding to the virtual machines configured by the client devices so as to logically connect the corresponding switch devices, and does not establish the logical tunnels among the switch devices which do not correspond to the virtual machines configured by the client devices, wherein the switch devices includes the physical switch devices and the virtual switch devices.

In addition, when the first virtual machine and the second virtual machine attempt to communicate with each other for the first time, the data processing module included in the controller 20 obtains the tenant network topology information from the network information table, and converts the tenant network topology information into one or more corresponding flow tables, which are distributed to the switch devices corresponding to the virtual machines configured by the client devices.

Figure 5:
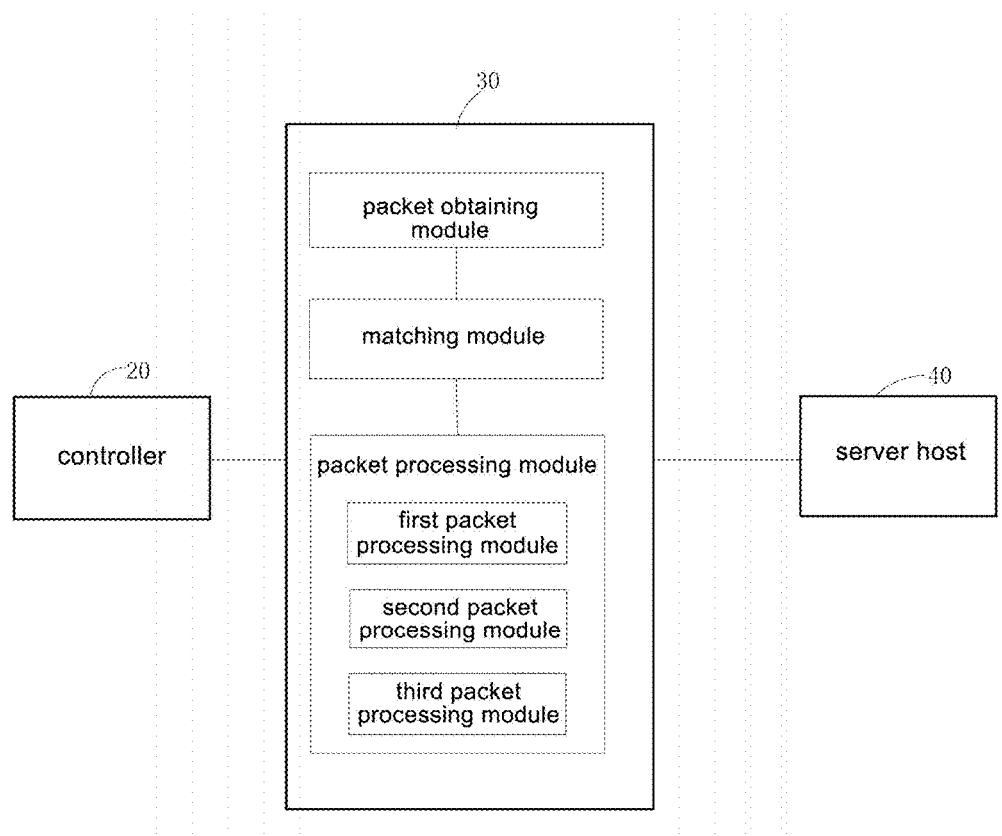
FIG. 5 is a schematic view showing an architecture of a switch device as well as components connected to the switch device according to an embodiment of the present disclosure.

As shown in FIG. 5, the switch device 30 includes: a packet obtaining module that receives a packet transmitted during the communication between a first virtual machine and a second virtual machine; a matching module that obtains one or more flow tables from a controller, and obtains matching results by matching operations with the flow tables, wherein the flow tables are used for the communication between the virtual machines configured by a resource pool management system based on operations on a network resource pool by a user, and the flow tables are generated by the controller based on information on network resources for virtual machines; and a packet processing module that controls the communication between the first virtual machine and the second virtual machine based on the matching results.

The packet processing module includes a first packet processing module that discards directly a packet to be transmitted during the communication for the first time and subsequent communication between the first virtual machine and the second virtual machine, in response to determining that the communication between the first virtual machine and the second virtual machine is disabled based on the matching results.

In addition, the switch device further includes: a determination module that determines whether the communication between the first virtual machine and the second virtual machine is performed for the first time; and a packet conversion module that converts the packet into a first packet_in packet and transmits the first packet_in packet to the controller in response to determining that the communication between the first virtual machine and the second virtual machine is performed for the first time, and transmits the packet to the matching module in response to determining that the communication between the first virtual machine and the second virtual machine is not performed for the first time.

In particular, the packet processing module includes:

a second packet processing unit that transmits the packet to the switch device corresponding to the second virtual machine, in response to determining that the first virtual machine and the second virtual machine are capable of communicating with each other based on the matching results; and a third packet processing unit that converts the packet into a second packet_in packet and transmits the second packet_in packet to the controller, so that the controller obtains the second packet_in packet, calculates an end-to-end path based on correspondence information between a server host and the first virtual machine and correspondence information between the server host and the second virtual machine, and generates the flow table between the first virtual machine and the second virtual machine, in response to determining that none of the flow tables is consistent with the communication between the first virtual machine and the second virtual machine based on the matching results.

In the above embodiment, in response to determining that the first virtual machine and the second virtual machine communicate with each other for the first time, the switch device 30 converts the packet into a first packet_in packet, transmits the first packet_in packet to the controller, obtains a flow table from the controller 20, and determines whether the first virtual machine is capable of communicating with the second virtual machine by matching operations with the flow tables. When the communication between the first virtual machine and the second virtual machine is not performed for the first time, the switch device 30 directly matches the communication with the flow tables.

For example, when the first virtual machine and the second virtual machine of the client device 1 communicate with each other, the matching module included in the switch device 30 firstly matches the communication with the flow tables corresponding to the client device 1 to obtain a matching result in response to determining that the communication between the first virtual machine and the second virtual machine is not performed for the first time. The matching result may be one of at least following three results. In a first result, it is determined that the first virtual machine and the second virtual machine are capable of communicating with each other based on the flow tables. In a second result, it is determined that the first virtual machine and the second virtual machine are incapable of communicating with each other based on the flow tables. In a third result, there is no flow table indicating whether the first virtual machine and the second virtual machine are capable of communicating with each other in the flow tables.

For the first result, the first packet processing unit included in the switch device 30 transmits the packet to the switch device corresponding to the second virtual machine, so as to establish a service connection between the first virtual machine and the second virtual machine.

For the second result, the second packet processing unit included in the switch device 30 directly discards the received packet.

For the third result, the third packet processing unit included in the switch device 30 converts the received packet into a second packet_in packet and transmits the second packet_in packet to the controller, so that the path calculation module included in the controller 20 obtains the second packet_in packet, calculates an end-to-end path based on correspondence information between a server host and the first virtual machine and correspondence information between the server host and the second virtual machine, and generates the flow table between the first virtual machine and the second virtual machine.

In addition, when the matching result is the third result, the switch device 30 further receives the flow table formed by the path calculation module included in the controller based on the second packet_in packet.

Figure 6:
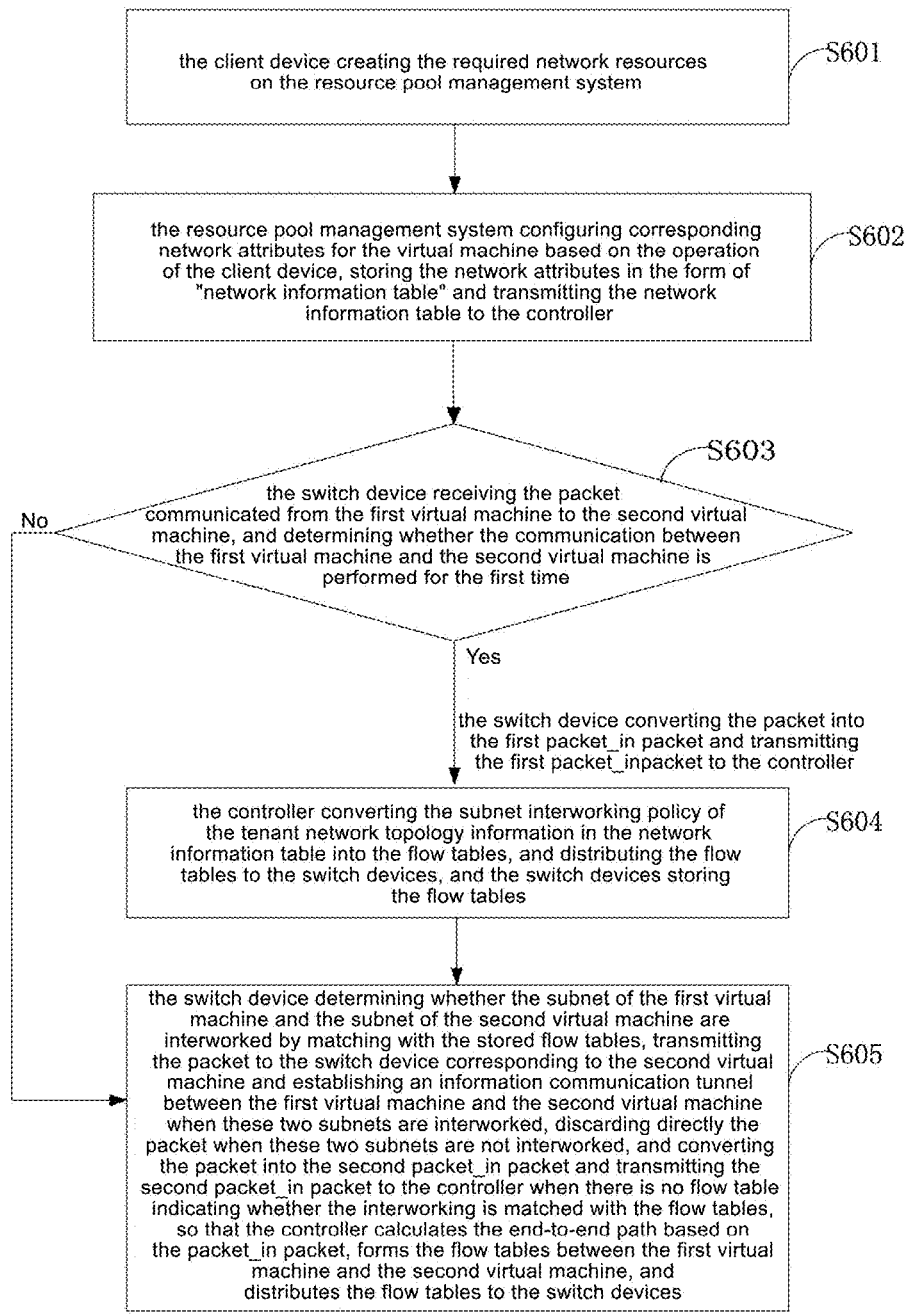
FIG. 6 is a flow chart for creating network resources by a communication method of the communication system according to an embodiment of the present disclosure.

FIG. 6 is a flow chart for operation of the communication system according to the embodiment of the present disclosure. For example, in the case that the client device creates the required network resources on the resource pool management system, the process includes steps of:

S601: the client device creating the required network resources on the resource pool management system;

S602: the resource pool management system 10 configuring corresponding network attributes for the virtual machine based on the operation of the client device, storing the network attributes in the form of "network information table" and transmitting the network information table to the controller 20;

S603: the switch device 30 receiving the packet communicated from the first virtual machine to the second virtual machine, determining whether the communication between the first virtual machine and the second virtual machine is performed for the first time, converting the packet into a first packet_in packet, transmitting the first packet_in packet to the controller 20 and then executing a step S604 in response to determining that the communication between the first virtual machine and the second virtual machine is performed for the first time, and executing a step S605 in response to determining that the communication between the first virtual machine and the second virtual machine is not performed for the first time;

S604: the controller 20 converting the tenant network topology information in the network information table into the flow tables, and distributing the flow tables to the switch devices 30, and the switch devices 30 storing the flow tables;

S605: the switch devices 30 determining whether the subnet of the first virtual machine and the subnet of the second virtual machine are interworked by matching with the stored flow tables, transmitting the packet to the switch device corresponding to the second virtual machine when these two subnets are interworked, discarding directly the packet when these two subnets are not interworked, and converting the packet into the second packet_in packet and transmitting the second packet_in packet to the controller 20 when there is no flow table indicating the whether the interworking is matched with the flow tables, so that the controller 30 may calculate the end-to-end path based on the packet_in packet, form the flow tables between the first virtual machine and the second virtual machine, and distribute the flow tables to the switch devices.

Figure 7:
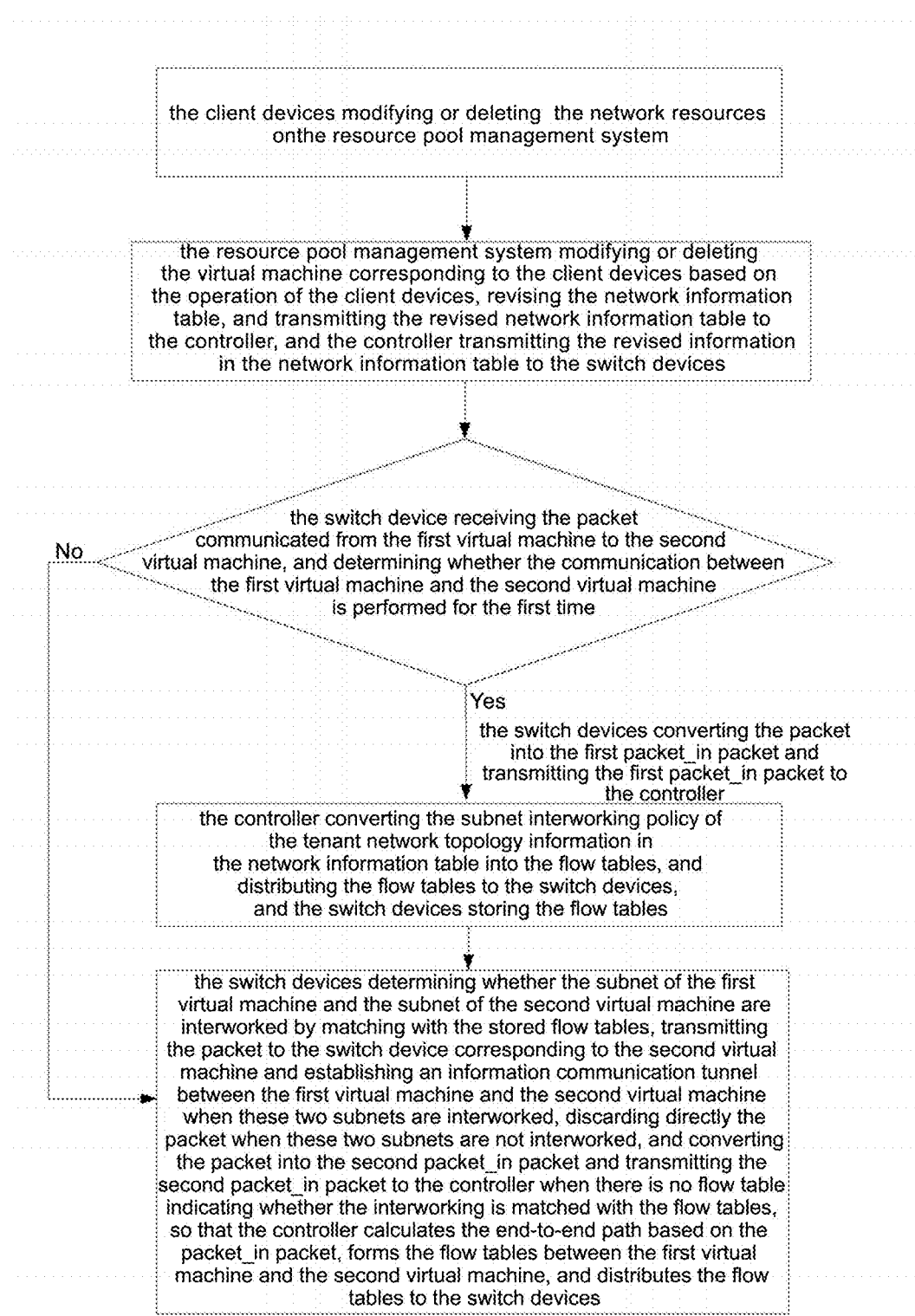
FIG. 7 is a flow chart for modifying or deleting network resources by a communication method of the communication system according to an embodiment of the present disclosure.

In the above, it is explained the process for creating the network resources on the resource pool management system by the user. Similarly, as shown in FIG. 7, when the user modifies or deletes the network resources on the resource pool management system, the process mainly includes steps of:

the client device modifying or deleting the network resources on the resource pool management system;

the resource pool management system modifying or deleting the virtual machine corresponding to the client device based on the operation of the client device, revising the network information table, and transmitting the revised network information table to the controller, and the controller transmitting the revised information in the network information table to the switch device;

when the switch device receives the packet transmitted from the first virtual machine to the second virtual machine, the switch device controls the communication between these two virtual machines based on the revised network information table, which is same as the steps S603 to S605 in FIG. 6 for creating the virtual machines.

As a result, the above resource pool management system 10, the above controllers 20 and the above switch devices 30 may operate cooperatively, so as to determine the network attributes of the virtual machines based on the operation of the client device, make corresponding changes on the network resources, and the controller obtains the topology information of the whole network. Comparing with the SDN architecture in the related art, in the embodiments of the present disclosure, it is not necessary for the controller to broadcast the ARP messages to the whole SDN when the two virtual machines attempt to communicate with each other for the first time. As a result, it is reduced the number of the packet_in packets to be transmitted to the SDN controller, and thereby the network resources of the SDN may be fully utilized, and the availability of the network resources and the controller resources are improved.

In the above, it is explained operation principles and architectures in the present disclosure. The present disclosure provides in some embodiments a communication system including the above architecture. The components of such communication system are as shown in FIGS. 2-6, and thus are not repeated herein.

Figure 8:
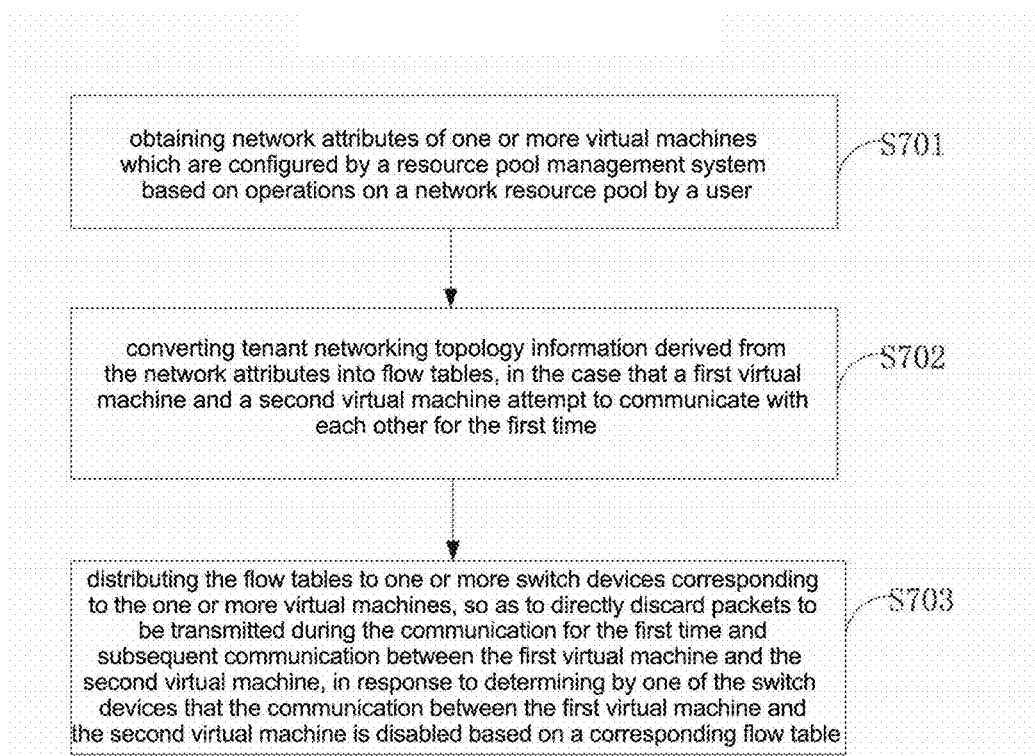
FIG. 8 is a flow chart show showing a communication method according to a first embodiment of the present disclosure.

In addition, as shown in FIGS. 8 and 2, the present disclosure further provides in some embodiments a communication method for a controller in an SDN, including steps of:

S701: obtaining network attributes of one or more virtual machines which are configured by a resource pool management system based on operations on a network resource pool by a user;

S702: converting tenant networking topology information derived from the network attributes into flow tables, in the case that a first virtual machine and a second virtual machine attempt to communicate with each other for the first time; and S703: distributing the flow tables to one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

In particular, after step S701, the communication method further includes a step of: establishing one or more logical tunnels among the one or more switch devices corresponding to the one or more virtual machines, so as to logically connect the corresponding switch devices.

In addition, after the step of distributing the flow tables to one or more switch devices corresponding to the one or more virtual machines, the communication method further includes a step of: controlling, by the one or more switch devices, the communication between the first virtual machine and the second virtual machine based on the flow tables, which includes steps of:

receiving a packet transmitted from the first virtual machine to the second virtual machine, and converting the received packet into a first packet_in packet in response to determining that the first virtual machine and the second virtual machine communicate with each other for the first time;

receiving a packet transmitted from the first virtual machine to the second virtual machine, and in response to determining that the first virtual machine and the second virtual machine do not communicate with each other for the first time, the method further includes steps of:

determining that the first virtual machine and the second virtual machine are capable of communicating with each other in the case that the communication between the first virtual machine and the second virtual machine is consistent with one of the flow tables, and transmitting the packet to the switch device corresponding to the second virtual machine;

determining that the first virtual machine and the second virtual machine are incapable of communicating with each other when the communication between the first virtual machine and the second virtual machine is consistent with none of the flow tables, and directly discarding the packet; and converting the packet into a second packet_in packet in response to determining that none of the flow tables is consistent with the communication between the first virtual machine and the second virtual machine, and transmitting the second packet_in packet outwardly.

Furthermore, after the step S703, the communication method further includes steps of:

receiving a report packet transmitted by the switch device;

converting the tenant networking topology information into the flow table in the case that the report packet is the first packet_in packet; and calculating an end-to-end path based on correspondence information between a server host and the first virtual machine and correspondence information between the server host and the second virtual machine, forming the flow table between the first virtual machine and the second virtual machine, and transmitting the flow table to the switch devices corresponding to the first virtual machine and the second virtual machine respectively, in the case that the report packet is the second packet_in packet.

For example, in the step S701, the network attributes are recorded in a network information table which is created by the resource pool management system based on the network attributes.

Figure 9:
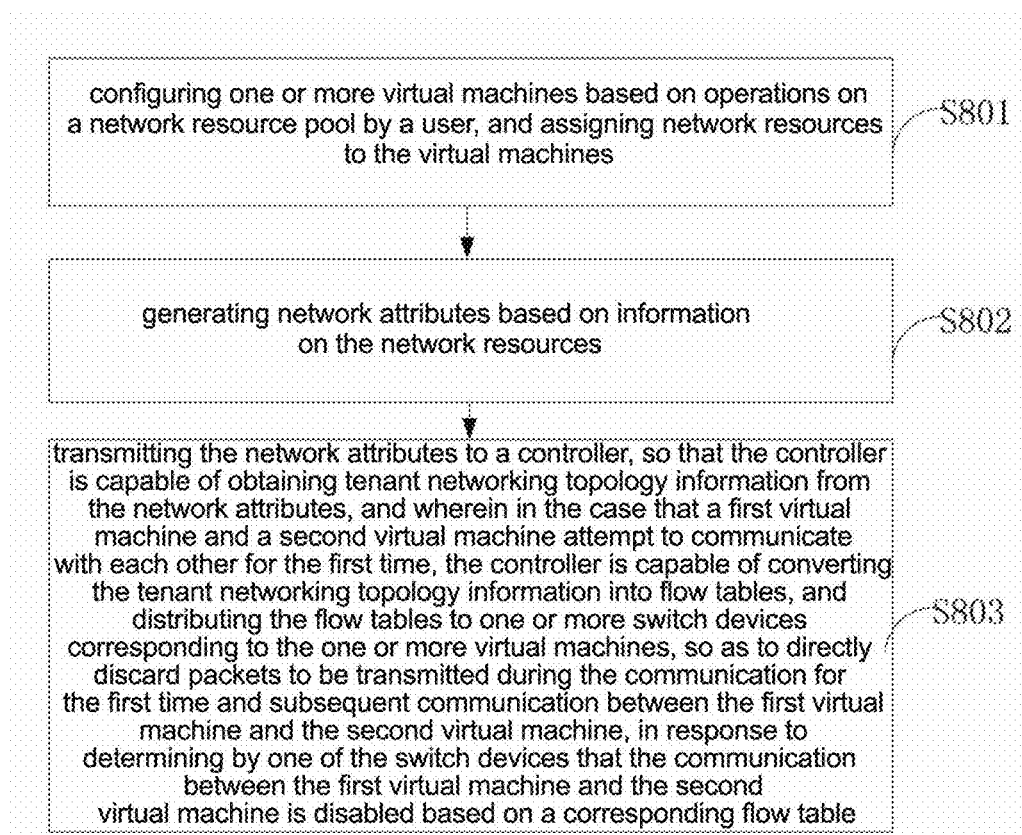
FIG. 9 is a flow chart show showing a communication method according to a second embodiment of the present disclosure.

In addition, as shown in FIGS. 2 and 9, the present disclosure further provides in some embodiments a communication method for a resource pool management system in an SDN, including steps of:

S801: configuring one or more virtual machines based on operations on a network resource pool by a user, and assigning network resources to the virtual machines;

S802: generating network attributes based on information on the network resources; and S803: transmitting the network attributes to a controller, so that the controller is capable of obtaining tenant networking topology information from the network attributes, and wherein in the case that a first virtual machine and a second virtual machine attempt to communicate with each other for the first time, the controller is capable of converting the tenant networking topology information into flow tables, and distributing the flow tables to one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

In particular, the step 801 includes steps of:

configuring the virtual machines based on operations on the network resource pool by the user; and creating in a physical network resource the same number of virtual machines for physical ports and logical ports of at least one server host, and assigning corresponding network resources to the physical ports and the logical ports based on the virtual machines configured in the resource pool, wherein the physical network resource includes a plurality of server hosts and a plurality of switch devices.

After step S801, the communication method further includes a step of:

forming a network information table based on the network attributes, and transmitting the network attributes to the controller by transmitting the network information table to the controller.

Figure 10:
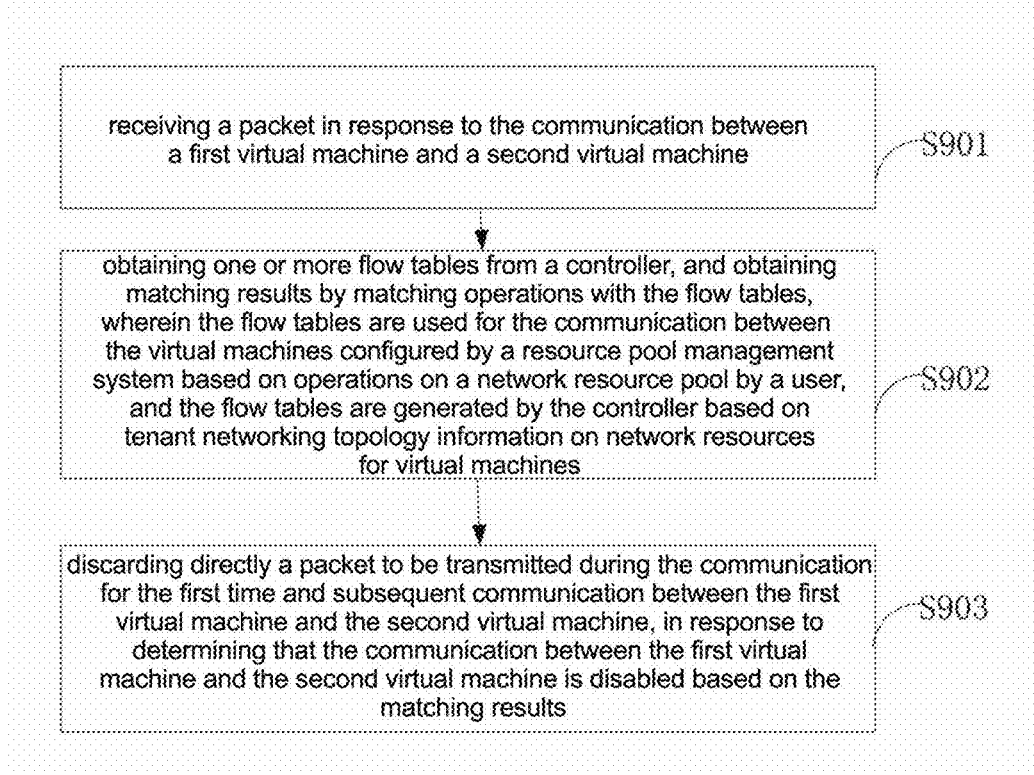
FIG. 10 is a flow chart show showing a communication method according to a third embodiment of the present disclosure.

As shown in FIGS. 2 and 10, the present disclosure further provides in some embodiments a communication method for a switch device in an SDN, including steps of:

S901: receiving a packet in response to the communication between a first virtual machine and a second virtual machine;

S902: obtaining one or more flow tables from a controller, and obtaining matching results by matching operations with the flow tables, wherein the flow tables are used for the communication between the virtual machines configured by a resource pool management system based on operations on a network resource pool by a user, and the flow tables are generated by the controller based on tenant networking topology information on network resources for virtual machines; and S903: discarding directly a packet to be transmitted during the communication for the first time and subsequent communication between the first virtual machine and the second virtual machine, in response to determine that the communication between the first virtual machine and the second virtual machine is disabled based on the matching results.

After step S901, the communication method further includes a step of:

determining whether the communication between the first virtual machine and the second virtual machine is performed for the first time, converting the packet into a first packet_in packet and transmitting the first packet_in packet to the controller in response to determining that the communication between the first virtual machine and the second virtual machine is performed for the first time, and executing further steps in response to determining that the communication between the first virtual machine and the second virtual machine is not performed for the first time.

In particular, after step S902, the communication method further includes steps of:

transmitting the packet to the switch device corresponding to the second virtual machine, in response to determining that the first virtual machine and the second virtual machine are capable of communicating with each other based on the matching results; and converting the packet into a second packet_in packet and transmitting the second packet_in packet to the controller, so that the controller obtains the second packet_in packet, calculates an end-to-end path based on correspondence information between a server host and the first virtual machine and correspondence information between the server host and the second virtual machine, and generates the flow table between the first virtual machine and the second virtual machine, in response to determining that none of the flow tables is consistent with the communication between the first virtual machine and the second virtual machine based on the matching results.

In the communication method according to the embodiment of the present disclosure, it is not necessary for the controller to broadcast the ARP messages to the whole SDN, and it is reduced the number of the packet_in packets to be transmitted to the SDN controller, so that the network resources of the SDN may be fully utilized, and the availability of the network resources and the controller resources are improved.

The above are merely the preferred embodiments of the present disclosure. A person skilled in the art may make further modifications and improvements without departing from the principle of the present disclosure, and these modifications and improvements shall also fall within the scope of the present disclosure.

What is claimed is:

1. A communication method for a control device in a Software-Defined Network (SDN), comprising steps of:
   obtaining, by the control device, network attributes of one or more virtual machines which are configured by a resource pool management system based on operations on a network resource pool by a user;
   obtaining, by the control device, a first packet sent by a switch device corresponding to a first virtual machine for the first time, obtaining tenant networking topology information in accordance with the network attributes of the one or more virtual machines configured by the resource pool management system, and generating flow tables used for forwarding or discarding by one or more switch devices subsequent packets after the first time in accordance with a determination result about whether or not the first packet can be forwarded based on the tenant networking topology information obtained, in the case that the first virtual machine and a second virtual machine begin to communicate with each other for the first time; and
   distributing, by the control device, the flow tables to the one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

2. The communication method according to claim 1, wherein after the step of obtaining the network attributes by the control device, the method further comprises a step of: establishing one or more logical tunnels among the one or more switch devices corresponding to the one or more virtual machines, so as to logically connect the corresponding switch devices.

3. The communication method according to claim 1, wherein after the step of distributing the flow tables to the one or more switch devices corresponding to the one or more virtual machines, the method further comprises a step of: controlling, by the one or more switch devices, the communication between the first virtual machine and the second virtual machine based on the flow tables, which comprises steps of:
   receiving a packet transmitted from the first virtual machine to the second virtual machine, and converting the received packet into a first packet_in packet in response to determining that the first virtual machine and the second virtual machine communicate with each other for the first time;
   receiving a packet transmitted from the first virtual machine to the second virtual machine, and in response to determining that the first virtual machine and the second virtual machine do not communicate with each other for the first time, the method further comprises steps of:
   determining that the first virtual machine and the second virtual machine are capable of communicating with each other in the case that the communication between the first virtual machine and the second virtual machine is consistent with one of the flow tables, and transmitting the packet to the switch device corresponding to the second virtual machine;
   determining that the first virtual machine and the second virtual machine are incapable of communicating with each other in the case that the communication between the first virtual machine and the second virtual machine is consistent with none of the flow tables, and directly discarding the packet; and
   converting the packet into a second packet_in packet in response to determining that none of the flow tables is consistent with the communication between the first virtual machine and the second virtual machine.

4. The communication method according to claim 3, further comprising steps of:
   receiving a report packet transmitted by the switch device;
   converting the tenant networking topology information into one or more flow tables in the case that the report packet is the first packet_in packet; and calculating an end-to-end path based on correspondence information between a server host and the first virtual machine and correspondence information between the server host and the second virtual machine, forming the flow table between the first virtual machine and the second virtual machine, and transmitting the flow table to the switch devices corresponding to the first virtual machine and the second virtual machine respectively, in the case that the report packet is the second packet_in packet.

5. The communication method according to claim 1, wherein in the step of obtaining network attributes of one or more virtual machines which are configured by a resource pool management system based on operations on a network resource pool by a user, the network attributes are recorded in a network information table which is created by the resource pool management system based on the network attributes;

wherein the tenant networking topology information comprises tenant subnet interworking policy information which is pre-configured by the user through the resource pool management system, information on positions of the server hosts where the virtual machines reside respectively, and information on the switch devices connected to the virtual machines; and wherein the network attributes comprise Internet Protocol (IP) addresses, Virtual Local Area Network (VLAN) Identifications (IDs), Virtual Extensible Local Area Network (VXLAN) IDs, tunnel IDs, and Virtual Routing and Forwarding (VRF) IDs of the virtual machines which are configured by the resource pool management system based on the operation of the user, information on server hosts where the virtual machines reside, physical switch device ports connected to the server hosts, and the tenant networking topology information.

6. The communication method according to claim 1, wherein
the resource pool management system configures one or more virtual machines based on operations on a network resource pool by a user, and assigns network resources to the virtual machines;
the resource pool management system generates network attributes based on information on the network resources; and
the resource pool management system transmits the network attributes to the control device, so that the control device is capable of obtaining tenant networking topology information from the network attributes, and wherein in the case that a first virtual machine and a second virtual machine begin to communicate with each other for the first time, the control device is capable of converting the tenant networking topology information into flow tables, and distributing the flow tables to one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

7. The communication method according to claim 6, wherein
the resource pool management system configures the one or more virtual machines based on operations on the network resource pool by the user; and the resource pool management system creates in a physical network resource the same number of virtual machines for physical ports and logical ports of at least one server host, and assigns corresponding network resources to the physical ports and the logical ports based on the virtual machines configured in the resource pool, wherein the physical network resource comprises a plurality of server hosts and a plurality of switch devices.

8. The communication method according to claim 6, wherein after the resource pool management system generates network attributes based on information on the network resources, the resource pool management system forms a network information table based on the network attributes, and transmits the network attributes to the control device by transmitting the network information table to the control device.

9. The communication method according to claim 1, wherein
the one or more switch devices receive a packet in response to the communication between a first virtual machine and a second virtual machine;
the one or more switch devices obtain one or more flow tables from the control device, and obtain matching results by matching operations with the flow tables, wherein the flow tables are used for the communication between the virtual machines configured by a resource pool management system based on operations on a network resource pool by a user, and the flow tables are generated by the control device based on tenant networking topology information on network resources for virtual machines; and
the one or more switch devices discard directly a packet to be transmitted during the communication for the first time and subsequent packets between the first virtual machine and the second virtual machine, in response to determining that the communication between the first virtual machine and the second virtual machine is disabled based on the matching results.

10. The communication method according to claim 9, wherein after the one or more switch devices receive a packet transmitted during the communication between a first virtual machine and a second virtual machine, the one or more switch devices determine whether the communication between the first virtual machine and the second virtual machine is performed for the first time, convert the packet into a first packet_in packet and transmit the first packet_in packet to the control device in response to determining that the communication between the first virtual machine and the second virtual machine is performed for the first time, and execute further steps in response to determining that the communication between the first virtual machine and the second virtual machine is not performed for the first time.

11. The communication method according to claim 9, wherein after the one or more switch devices obtain matching results, the one or more switch devices transmit the packet to the switch device corresponding to the second virtual machine, in response to determining that the first virtual machine and the second virtual machine are capable of communicating with each other based on the matching results; and
the one or more switch devices convert the packet into a second packet_in packet and transmit the second packet_in packet to the controller, so that the control device obtains the second packet_in packet, calculates an end-to-end path based on correspondence information between a server host and the first virtual machine and correspondence information between the server host and the second virtual machine, and generates the flow table between the first virtual machine and the second virtual machine, in response to determining that none of the flow tables is consistent with the communication between the first virtual machine and the second virtual machine based on the matching results.

12. A switch device comprising a controller and a storage device, wherein when the controller calls and executes programs stored in the storage device, the following circuits are realized:
   a packet obtaining circuit that receives a first packet transmitted during the communication for the first time between a first virtual machine and a second virtual machine;
   a matching circuit that obtains flow tables used for forwarding or discarding by one or more switch devices including the switch device subsequent packets after the first time in accordance with a determination result about whether or not the first packet can be forwarded based on tenant networking topology information obtained, in the case that the first virtual machine and the second virtual machine begin to communicate with each other for the first time, wherein the flow tables are generated by a control device based on information on network resources for virtual machines; and
   a first packet processing circuit that discards directly a first packet to be transmitted during the communication for the first time and subsequent packets transmitted between the first virtual machine and the second virtual machine, in response to determining that the communication between the first virtual machine and the second virtual machine is disabled based on the matching results.

13. The switch device according to claim 12, further comprising:
   a determination circuit that determines whether the communication between the first virtual machine and the second virtual machine is performed for the first time; and
   a packet conversion circuit that converts the first packet into a first packet_in packet and transmits the first packet_in packet to the control device in response to determining that the communication between the first virtual machine and the second virtual machine is performed for the first time, and transmits the first packet to the matching circuit in response to determining that the communication between the first virtual machine and the second virtual machine is not performed for the first time.

14. The switch device according to claim 12, further comprising:
   a second packet processing circuit that transmits the first packet to the switch device corresponding to the second virtual machine, in response to determining that the first virtual machine and the second virtual machine are capable of communicating with each other based on the matching results; and
   a third packet processing circuit that converts the first packet into a second packet_in packet and transmits the second packet_in packet to the control device, so that the control device obtains the second packet_in packet, calculates an end-to-end path based on correspondence information between a server host and the first virtual machine and correspondence information between the server host and the second virtual machine, and generates the flow table between the first virtual machine and the second virtual machine, in response to determining that none of the flow tables is consistent with the communication between the first virtual machine and the second virtual machine based on the matching results.

15. A control device for a Software-Defined Network (SDN), wherein the control device comprises a controller and a storage device, when the controller calls and executes programs stored in the storage device, the following circuits are realized:
   a data receiving circuit that obtains network attributes of one or more virtual machines which are configured by a resource pool management system based on operations on a network resource pool by a user;
   a data processing circuit that obtains a first packet sent by a switch device corresponding to a first virtual machine for the first time, obtains tenant networking topology information in accordance with the network attributes of the one or more virtual machines configured by the resource pool management system, and generates flow tables used for forwarding or discarding by one or more switch devices subsequent packets after the first time in accordance with a determination result about whether or not the first packet can be forwarded based on the tenant networking topology information obtained, in the case that the first virtual machine and a second virtual machine begin to communicate with each other for the first time; and
   a data transmission circuit that distributes the flow tables to the one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

16. The control device according to claim 15, wherein the control device further comprises:
   a resource establishment circuit that establishes one or more logical tunnels among the one or more switch devices corresponding to the one or more virtual machines, so as to logically connect the corresponding switch devices.

17. The control device according to claim 15, wherein the data receiving circuit further receives a report packet transmitted by the switch device, wherein the data processing circuit converts the tenant networking topology information into the flow table in the case that the report packet is the first packet_in packet, and the first packet_in packet is obtained by converting a packet received by the switch device in response to the communication between the first virtual machine and the second virtual machine for the first time;
   the control device further comprises:
   a path calculation circuit that calculates an end-to-end path based on correspondence information between a server host and the first virtual machine and correspondence information between the server host and the second virtual machine, forms the flow table between the first virtual machine and the second virtual machine, and transmits the flow table to the switch devices corresponding to the first virtual machine and the second virtual machine respectively, in the case that the report packet is a second packet_in packet, wherein in the case that the switch device receives a packet in response to the communication between the first virtual machine and the second virtual machine not performed for the first time, and determines that none of the flow tables is consistent with the communication between the first virtual machine and the second virtual machine, the switch device converts the packet into the second packet_in packet and transmits the second packet_in packet to the data receiving circuit.

18. The control device according to claim 15, wherein the data receiving circuit obtains a network information table from the resource pool management system, and the network attributes are recorded in the network information table which is created by the resource pool management system based on the network attributes;
    wherein the tenant networking topology information comprises tenant subnet interworking policy information which is pre-configured by the user through the resource pool management system, information on positions of the server hosts where the virtual machines reside respectively, and information on the switch devices connected to the virtual machines; and
    wherein the network attributes comprise Internet Protocol (IP) addresses, Virtual Local Area Network (VLAN) Identifications (IDs), Virtual Extensible Local Area Network (VXLAN) IDs, tunnel IDs, and Virtual Routing and Forwarding (VRF) IDs of the virtual machines which are configured by the resource pool management system based on the operation of the user, information on server hosts where the virtual machines reside, physical switch device ports connected to the server hosts, and the tenant networking topology information.

19. A resource pool management system comprising a controller and a storage device, wherein when the controller calls and executes programs stored in the storage device, the following circuits are realized:
    a resource management circuit that configures one or more virtual machines based on operations on a network resource pool by a user, and assigns network resources to the virtual machines;
    an attribute generation circuit that generates network attributes based on information on the network resources; and
    an information transmission circuit that transmits the network attributes to a control device, so that the control device is capable of obtaining a first packet sent by a switch device corresponding to a first virtual machine for the first time, obtaining tenant networking topology information in accordance with the network attributes of the one or more virtual machines configured by the resource pool management system, and generating flow tables used for forwarding or discarding by one or more switch devices subsequent packets after the first time in accordance with a determination result about whether or not the first packet can be forwarded based on the tenant networking topology information obtained, in the case that the first virtual machine and a second virtual machine begin to communicate with each other for the first time, and distributing the flow tables to the one or more switch devices corresponding to the one or more virtual machines, so as to directly discard packets to be transmitted during the communication for the first time and subsequent communication between the first virtual machine and the second virtual machine, in response to determining by one of the switch devices that the communication between the first virtual machine and the second virtual machine is disabled based on a corresponding flow table.

20. The resource pool management system according to claim 19, wherein the resource management circuit comprises:
    a calculation resource management circuit that configures the virtual machines based on operations on the network resource pool by the user; and
    a network resource management circuit that creates in a physical network resource the same number of virtual machines for physical ports and logical ports of at least one server host, and assigns corresponding network resources to the physical ports and the logical ports based on the virtual machines configured in the resource pool, wherein the physical network resource comprises a plurality of server hosts and a plurality of switch devices.

* * * * *